United States Patent [19]
Janvrin et al.

[11] Patent Number: 5,826,854
[45] Date of Patent: Oct. 27, 1998

[54] FLUID ROUTING SYSTEM

[75] Inventors: Bruce C. Janvrin, Coralville; Lyle J. Berkenbosch, Marion, both of Iowa

[73] Assignee: Amana Refrigeration, Inc., Amana, Iowa

[21] Appl. No.: 660,132

[22] Filed: Jun. 7, 1996

[51] Int. Cl.$^6$ .................................................. F16L 37/28
[52] U.S. Cl. ..................... 251/149.9; 137/549; 210/234
[58] Field of Search ........................... 137/549; 210/234, 210/232; 251/149.9

[56] References Cited

U.S. PATENT DOCUMENTS

| | | | |
|---|---|---|---|
| 2,544,244 | 3/1951 | Vokes ....................................... | 210/234 |
| 4,367,144 | 1/1983 | Peters et al. ............................. | 210/234 |
| 4,529,515 | 7/1985 | Selz ......................................... | 210/234 |
| 4,615,812 | 10/1986 | Darling ................................... | 210/234 |
| 5,390,701 | 2/1995 | Lessley et al. .......................... | 137/549 |
| 5,607,582 | 3/1997 | Yamazaki et al. ...................... | 251/292 |

*Primary Examiner*—A. Michael Chambers
*Attorney, Agent, or Firm*—Andrew J. Rudd; Glenn H. Lenzen, Jr.

[57] ABSTRACT

A fluid routing system for use in a fluid line is set forth which includes a fluid routing mechanism having a housing and a block, and a removable treatment device. The housing has an internal chamber, an inlet port for attaching to one part of a fluid line, an outlet port for attaching to another part of the fluid line, an inlet channel connecting the inlet port to the internal chamber, and an outlet channel connecting the internal chamber to the outlet port. The block is capable of movement between a first and second position and is disposed within the internal chamber of the housing. The block has a first internal cavity, a second internal cavity, an exterior surface, an inlet passageway connecting the first internal cavity with the exterior surface, and an outlet passageway connecting the second internal cavity with the exterior surface. The inlet passageway and the outlet passageway are configured to retain fluid therein when the treatment device is removed. In the first position, the inlet passageway of the block is aligned with the inlet channel of the housing and the outlet passageway of the block is aligned with the outlet channel of the housing for permitting flow of the fluid into the treatment device. In the second position, the inlet passageway of the block is misaligned with the inlet channel of the housing and the outlet passageway of the block is misaligned with the outlet channel of the housing for prohibiting flow of the fluid into the block.

35 Claims, 2 Drawing Sheets

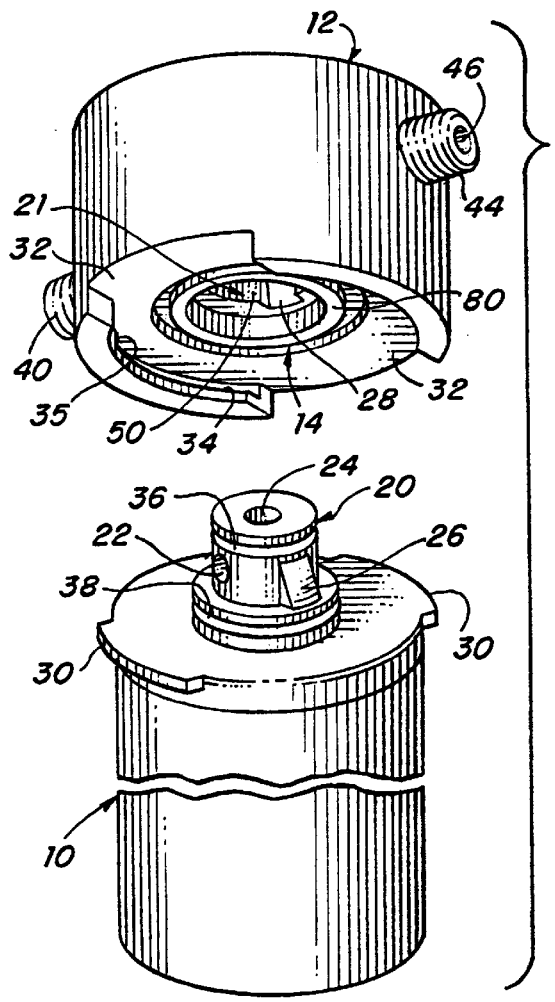
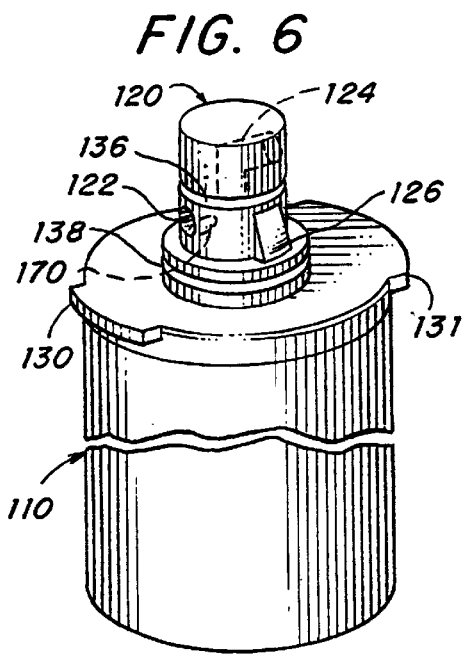
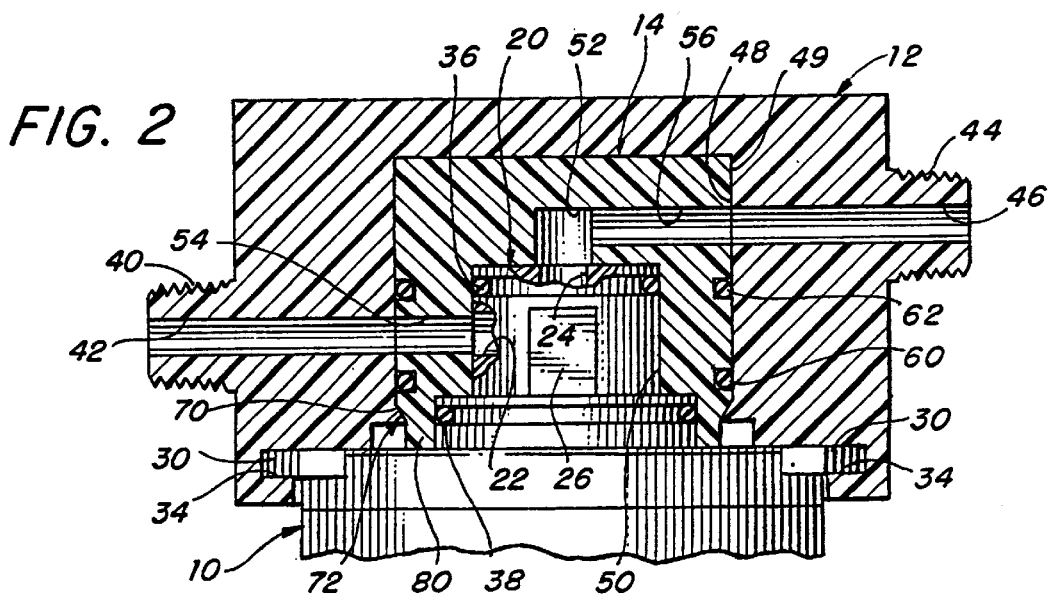

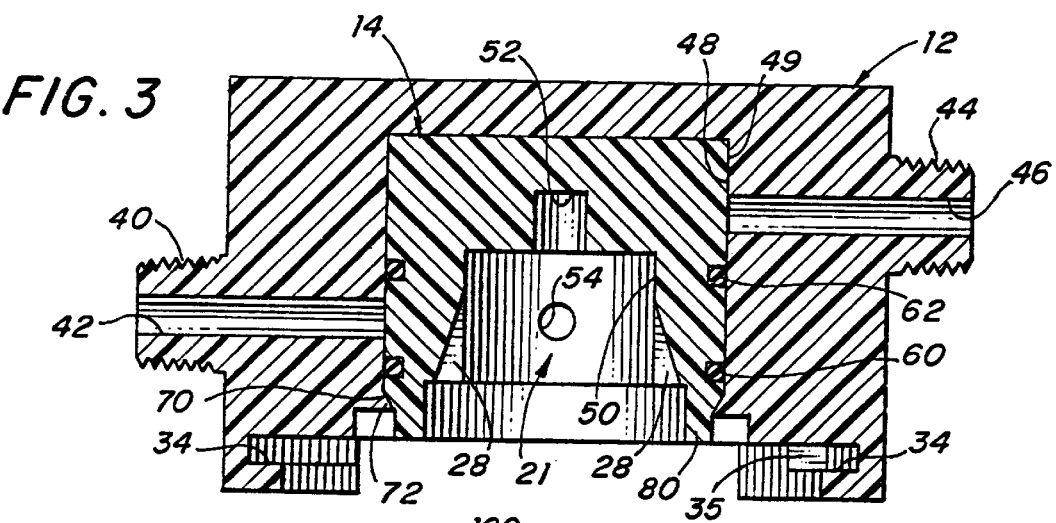
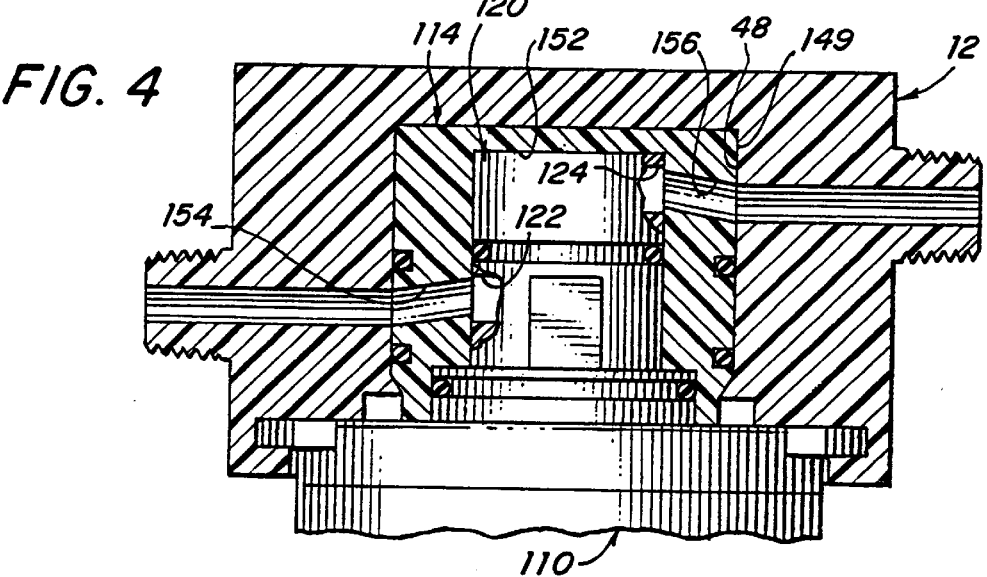
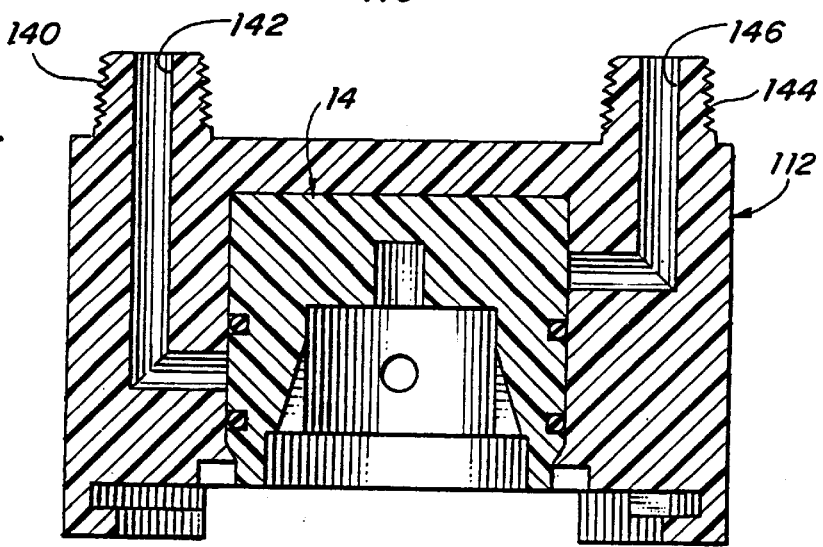

FLUID ROUTING SYSTEM

FIELD OF THE INVENTION

This invention relates generally to a fluid routing system for use with a fluid line comprising a fluid routing mechanism which is coupled to the fluid line and a periodically replaceable fluid treatment device mounted to the routing mechanism. More particularly, the present invention relates to a water routing system comprising a water routing mechanism and a replaceable filter for use in a household water line or in conjunction with an appliance, such as a refrigerator, that uses or dispenses water.

BACKGROUND OF THE INVENTION

Often, fluid contained in a fluid line must have its characteristics or properties treated, e.g., filtered, altered, detected or otherwise analyzed. Typically, this requires a break in the fluid line so that the fluid can be accessed and routed through a device which does the treatment. For example, if the fluid needs to have impurities removed, the fluid is circulated through a filtration device.

In the situation described above, it is desirable to have the fluid routing system make a fluid-tight seal or connection with the fluid line during normal operation. Thus, the routing mechanism to which the fluid treatment device is attached typically includes a valve that controls the flow of fluid to the device during normal operation and prevents the flow of fluid to the device during replacement of the device. Since the device requires periodic replacement, the routing mechanism must also provide for easy installation of the device.

In known water routing systems used to remove impurities from household tap water, a filter cartridge is inserted into a water line routing mechanism and rotated to a first position to permit flow of water from the water line into the filter during normal operation. The filter cartridge is rotated to a second position to prevent the flow of water into the water line routing mechanism during the removal and replacement of the filter cartridge. Thus, the routing mechanism acts as a valve which is opened and closed by the rotation of the filter cartridge. However, in these known devices, the removal of the filter cartridge results in an undesirably large discharge of water that is contained in the routing mechanism between the water lines and the filter cartridge.

Ideally, in any fluid routing system, including the water routing system described above, it is desirable to replace the fluid treatment device with a minimal or no discharge of fluid from the fluid lines, the routing mechanism, and the fluid treatment device. Consequently, any clean-up required after replacement is reduced or eliminated. And, if the fluid routing system is positioned near electrical equipment, providing a system which minimizes or eliminates the discharge of fluid during replacement of the fluid treatment device drastically reduces the likelihood of electrical shock. Moreover, such a system reduces the likelihood of injury to the person replacing the treatment device if the fluid is extremely hot or cold, or caustic. It should be noted that the term "fluid" is used generically, as in the art of fluid mechanics, where fluid includes not only liquids, but gases as well.

Therefore, a need exists for a fluid routing system comprising a routing mechanism and a replaceable fluid treatment device that allows for easy installation and replacement of the fluid treatment device with a minimum or no discharge of fluid.

SUMMARY OF THE INVENTION

The present invention is a fluid routing system which can be used on a line carrying any fluid. However, the invention will be described herein in the context of a water routing system used to remove impurities from household tap water. The water routing system comprises a routing mechanism having both a housing and a block, and a removable filter cartridge which requires periodic replacement. The routing mechanism receives water from a first segment of a water line, routes the water through the filter cartridge, and returns the filtered water to a second segment of the water line. The routing mechanism and filter cartridge are configured to provide for easy installation of the filter and for the minimization or elimination of the discharge of water when the filter device is removed for replacement.

The housing has an internal chamber, an inlet port and an outlet port respectively connected to the first and second segments of the water line. The housing further includes an inlet channel connecting the inlet port to the internal chamber and an outlet channel connecting the internal chamber to the outlet port.

The block has a first internal cavity, a second internal cavity, and an exterior surface. The block is positioned within the internal chamber of the housing. An inlet passageway connects the first internal cavity to the exterior surface while an outlet passageway connects the second internal cavity to the exterior surface.

The filter device, which is detachably attached to the housing, is inserted into the first cavity of the block. The filter device includes an inlet aperture and an outlet aperture which are near the inlet and outlet passageways of the block, respectively. The filter device intakes water from the inlet passageway of the block through the inlet aperture and returns the filtered water to the outlet passageway of the block through the outlet aperture. The inlet and outlet passageways of the block are preferably short such that they retain only a small volume of water. Furthermore, the inlet and outlet passageways are oriented to retain water therein when the filter device is removed. In one embodiment, the inlet and outlet passageways are approximately horizontal, and they retain any water therein due to capillary action when the filter device is removed and replaced with a new filter device. In another embodiment, the inlet and outlet passageways are angled upwardly to use the force of gravity and retain the water therein when the filter device is removed. In another embodiment the filter device is inserted into both the first and second cavities of the block and has the inlet aperture and outlet aperture immediately adjacent to the inlet and outlet passageways of the block respectively. Consequently, the present invention minimizes or eliminates the discharge water when the filter is removed.

Rotation of the filter device translates the block from a first position to a second position. In a first position, the inlet passageway of the block is aligned with the inlet channel of the housing to permit the flow of water from the water line, through the inlet channel, and into the inlet passageway and inlet aperture. In this first position, the outlet passageway of the block is aligned with the outlet channel of the housing to allow filtered water to flow from the outlet aperture, through the outlet passageway and the outlet channel, and finally back into the water line.

In a second position, the inlet passageway of the block is misaligned with the inlet channel of the housing and the outlet passageway of the block is misaligned with the outlet channel of the housing. Consequently, the water is prohibited from entering the block through either the inlet passageway or the outlet passageway. By rotating the filter device, the block acts as a valve in controlling the flow of water to and from the filter device.

BRIEF DESCRIPTION OF THE DRAWINGS

Other objects and advantages of the invention will become apparent upon reading the following detailed description and upon reference to the drawings in which:

FIG. 1 is an isometric illustrating the fluid treatment device, the housing, and the rotatable block of the claimed invention;

FIG. 2 is a cross-section of the housing and the rotatable block in the first position with the fluid treatment device shown in an elevation view and partially broken away;

FIG. 3 is a cross-section of the housing and the rotatable block in the second position;

FIG. 4 is a cross-section of the housing and an alternative rotatable block with the inlet and outlet passageways inclined and with an alternative fluid treatment device, illustrated in FIG. 6, shown in an elevation view that is partially broken away;

FIG. 5 is a cross section of an alternative housing and the rotatable block in the second position with the fluid treatment device shown in an elevation; and FIG. 6 is an isometric of fluid treatment device with an alternative head configuration.

While the invention is susceptible to various modifications and alternative forms, a specific embodiment thereof has been shown by way of example in the drawings and will herein be described in detail. It should be understood, however, that it is not intended to limit the invention to the particular forms disclosed. On the contrary the intention is to cover all modifications, equivalents, and alternatives falling within the spirit and scope of the invention as defined by the appended claims.

DETAILED DESCRIPTION OF THE INVENTION

Referring initially to FIG. 1, the top portion of the water treatment device, which is a filter 10 in this case, is displaced a short distance from a housing 12 and a rotatable block 14 is positioned within the housing 12. The filter 10 includes a head 20 for insertion into an internal cavity 21 of the rotatable block 14. The head 20 includes an inlet aperture 22 at its side and an outlet aperture 24 at its top. Fluid, in this case water, enters the inlet aperture 22 and circulates through the filter 10 until it is ejected from the filter 10 through the outlet aperture 24. The internal structure of the filter 10 may include a variety of filtration media which removes impurities, particulates or other undesirable components from the water.

The head 20 of the filter 10 includes cams 26 one of which can be seen while the second of which is located symmetrically to the first on the other side of the head 20. The cams 26 are inserted into gaps 28 that are adjacent the internal cavity 21 of the rotatable block 14. Furthermore, the body of the filter 10 includes protrusions 30 which are captured by openings 32 in the housing 12. Once the head 20 of the filter 10 is inserted into the internal cavity 21 of the rotatable block 14 and the filter 10 is rotated relative to rotatable block 14, the protrusions 30 enter and slide within symmetrically located guiding tracks 34 (only one shown) within the housing 12. Each guiding track 34 includes a stop 35 limiting the rotation of the filter 10. The filter 10 is detachably attached to the housing 12 due to the cooperation of the protrusions 30 and the tracks 34 while being in a fixed relation to the block 14. It should be noted that the filter 10 cannot be installed in the housing 12 and the block 14 if the block 14 has been slightly rotated due to the required spatial relationship between the gaps 28 and the openings 32 which is mandated by the fixed positions of the cams 26 and the protrusions 30 of the filter 10. In that case, the block 14 must be rotated to the proper position before insertion is possible.

The protrusions 30 may be thinner in the axial direction of the filter 10 at the ends which initially engage tracks 34 than at the opposing ends for ease of installation. Alternatively, the tracks 34 may be wider near openings 32 such that the initial engagement of the protrusions 30 to the tracks 34 occurs with ease.

The rotation of the filter 10 also causes the cams 26 to engage the walls of the gaps 28 and rotate the rotatable block 14 relative to the housing 12. As described in detail with reference to FIG. 2, the rotation of the filter 10 acts to place the rotatable block 14 in a position which allows for the flow of water to and from the filter 10.

The head 20 of the filter 10 also includes a small head O-ring 36 and a large head O-ring 38 which allows for the sealing of the head 20 after insertion into the rotatable block 14. The small head O-ring 36 inhibits the flow of water along the sides of the head 20. The large head O-ring 38 ensures that water enters the inlet aperture 22 and does not flow below the head 20 of the filter 10. When the fluid is water, the large and small head O-rings 38 and 36 can be made of a variety of materials including elastomers such as VITON® from E. I. DuPont De Nemours & Co. of Wilmington, Del.

Referring now to FIG. 2, the housing 12 and the rotatable block 14 are shown in cross-section with the filter 10 in an elevation view. The housing 12 includes an inlet port 40 which leads to an inlet channel 42 and an outlet port 44 which leads to an outlet channel 46. Both the inlet channel 42 and the outlet channel 44 extend through the housing 12 and are exposed at an inner surface 48 of the housing 12. The inner surface 48 of the housing 12 is disposed adjacent an exterior surface 49 of the rotatable block 14. Typically, the inlet and outlet ports 40 and 44 are standard fittings with a diameter of 0.1875 inch or 0.25 inch.

The internal cavity 21 of the rotatable block 14 has a first cavity portion 50 and a second cavity portion 52. The second cavity portion 52 is made as small as possible to minimize the amount of water retained and discharged when the filter 10 is removed. An inlet passageway 54 connects the first cavity portion 50 to the exterior surface 49 of the rotatable block 14. An outlet passageway 56 connects the second cavity portion 52 to the exterior surface 49 of the rotatable block 14.

Preferably, the inlet passageway 54 and the outlet passageway 56 are approximately horizontal with respect to gravity. That is to say that these passageways 54 and 56 are at least horizontal or slightly inclined such that their portions near the internal cavity 21 are at a slightly higher elevation than their portions near the housing 12. Thus, when a filter 10 is removed, the water in the passageways 54 and 56 does not leak downwardly and exit the internal cavity 21 of the rotatable block 14 due to capillary action in the case of horizontal passageways or due to the force of gravity in inclined passageways. Furthermore, the passageways 54 and 56 are relatively short in that their axial lengths are preferably in the range from about 0.25 inch to about 1.0 inch. Minimizing the axial length of the passageways 54 and 56 also reduces the amount of water that is capable of leaking during replacement. Typically, the diameters of the passageways 54 and 56 are in the range from about 0.125 inch to about 0.25 inch.

Thus far, the filter 10 has been shown mounted vertically with respect to gravity. If the filter 10 is to be oriented horizontally with respect to gravity, then the passageways 54 and 56 are still positioned in the block 14 at an angle with respect to gravity to maintain the water therein when the horizontal filter 10 is replaced. In an alternative embodiment when the filter 10 is mounted horizontally, the one passageway that would normally release water therefrom due to gravity (i.e. aligned with the gravity vector) when the filter 10 is removed has its axial length reduced so that the amount of water released is minimized. In another alternative embodiment, the block 14 can have its inlet and outlet passageways in the same or similar circumferential and radial positions, but at offset axial positions, to accommodate mounting the filter 10 in either a horizontal or vertical position without releasing water from the block in either position when the filter 10 is removed.

The rotatable block 14 and housing 12 are typically made of polymeric materials such as polyvinyl-chloride (PVC), polypropylene, acrylic, acrylonitrile butadiene styrene resins (ABS), and high-density polyethylene. Thus, these pieces can be produced via common manufacturing methods such as injection molding and machining.

A first O-ring 60 is positioned below the inlet passageway 54 and extends around the rotatable block 14 so as to engage the inner surface 48 of the housing 12. A second O-ring 62 is positioned below the outlet passageway 56 and extends around the rotatable block 14 so as to engage the inner surface 48 of the housing 12. The first and second O-rings 60 and 62 provide a seal below the inlet and outlet passageways 54 and 56 to ensure the water flows therethrough and not along the seam between the exterior surface 48 of the rotatable block 14 and the inner surface 49 of the housing 12. When the fluid is water, the first and second O-rings 60 and 62 can be made of a variety of materials including VITON® from E. I. DuPont De Nemours & Co. of Wilmington. Del.

The rotatable block 14 is held within the housing 12 due to a capture fit configuration near a chamfer 70 along the bottom edge of the rotatable block 14. After the rotatable block 14 is inserted into the housing 12, the housing 12 is heated to a point where its material flows to form a capturing element 72 around the bottom edge of the rotatable block 14 at the chamfer 70. The flow of the material of the housing 12 does not cause the rotatable block 14 to be bonded to the housing 12.

The rotatable block 14 also includes a sealing projection 80 against which a large head O-ring 38 of the filter 10 is positioned. The sealing projection 80 and the large head O-ring 38 retain the fluid within the rotatable block 14. A small head O-ring 36 is disposed against a surface near the junction between the first cavity portion 50 and the second cavity portion 52. The small head O-ring 36 and this surface restrict fluid in the second cavity portion 52 from migrating into the first cavity portion 50.

FIG. 2 illustrates the relationship of the filter 10 to the housing 12 and rotatable block 14 in a first position while FIG. 3, described below, illustrates the second position. In the first position, the inlet channel 42 is aligned with the inlet passageway 54. Furthermore, the outlet channel 46 is aligned with the outlet passageway 56. The water is able to flow from the water line, into the inlet port 40, through the inlet channel 42 and inlet passageway 54, and into the inlet aperture 22 after which it contacts the filtration media within the filter 10. The water then leaves the filter 10 through the outlet aperture 24 and passes through the outlet passageway 56 and outlet channel 46 before exiting through the outlet port 44 of the housing 14 where the filtered water is returned to the water line. It should be noted that a small volume of water is contained within the second cavity portion 52 above the upper surface of the head 20 of the filter 10 adjacent the outlet aperture 24. This small volume of water, if it does not drain back into the filter 10 is discharged when the filter 10 is removed.

FIG. 3 illustrates the housing 12 and the rotatable block 14 in a second position with the filter 10 removed and the rotatable block 14 rotated. The amount of rotation necessary to move protrusions 30 along tracks 34 to openings 32 and effectuate the removal of the filter 10 is typically in the range from about 45° to about 180°. In a preferred embodiment, the amount of rotation required is approximately 90°. Once a small amount of this required rotation occurs (e.g. approximately 10° to 20°), the inlet channel 42 is completely misaligned with the inlet passageway 54 while the outlet channel 46 is completely misaligned with the outlet passageway 56. The exterior surface 49 of the rotatable block 14 then blocks the inlet and outlet channels 42 and 46 such that the water is maintained only within the housing 12 and the small cavity 52 in the block 14. Because of this blocking action of the exterior surface 49, the removal of the filter 10 results in only a minimal amount of water to flow from the internal cavity 52 of the rotatable block 14. Consequently, rotation of the filter 10 causes the housing 12 and rotatable block 14 combination to act as a valve and allows for the replacement of the filter 10. Also, when the filter 10 is removed, the water in the passageways 54 and 56 does not leak downwardly and exit the internal cavity 21 of the rotatable block 14 due to the passageways 54 and 56 being approximately horizontal as delineated above. In addition to the rotational movement which has been described, translational movement is possible as well to effectuate the alignment of the inlet and outlet channels 42 and 46 to the inlet and outlet passageways 54 and 56.

FIG. 3 also illustrates the gaps 28 into which the cams 26 on the head 20 of the filter 10 are inserted. The gaps 28 have a triangular-shaped profile that is similar to the profile of the cams 26. The cams 26 engage the walls defining the gaps 28 to rotate the rotatable block. Although two cams 26 are shown, one cam would also suffice.

In an alternative embodiment, the filter 10 can be fixed relative to the housing 12. Once the filter 10 is inserted into the block 14, the block 14 is rotated relative to the filter 10 and the housing 12 to align the inlet and outlet passageways 54 and 56 with the inlet and outlet channels 42 and 46. Rotation may be accomplished by a lever attached to the block 14.

FIG. 4 is similar to FIG. 2 except the rotatable block 14 of FIG. 2 has been altered and now includes reference numerals in the 100 series. The rotatable block 114 still includes an internal cavity 121 which includes a first portion 150 and a second portion 152. The second portion 152 is large enough to receive the alternative filter described in FIG. 6. The exterior surface 149 abuts against the inner surface 48 of the housing 12. The inlet passageway 154 is angled such that its highest elevation with respect to gravity is near the first cavity portion 150. Likewise, the outlet passageway 156 is angled such that its highest elevation is nearest the second cavity portion 152. The angle that the axis of each of these passageways 154 and 156 makes with the horizontal is in the range from about 5° to about 20°. Preferably, the lower edge of each passageway 154 and 156 near the internal cavity 121 is above the upper edge of the each passageway 154 and 156 near the housing 12. Although the rotatable block 114 with the angled passageways 154 and 156 has been described as receiving the filter of FIG. 6, the angled passageways 154 and 156 are also useful in the rotatable block 14 shown in FIGS. 2 and 3 which receives the filter 10 of FIG. 1.

In a further alternative, the passageways 154 and 156 initially are horizontal near the exterior surface 149, but then angle upwardly with respect to gravity before they reach the first internal cavity 150 and the second internal cavity 152, respectively. In each of these embodiments, the passageways 154 and 156 retain the water after the filter 10 is removed and, therefore, eliminate any leakage from the passageways 154 and 156 of the rotatable block 114.

FIG. 5 is similar to FIG. 3 except it illustrates an alternative embodiment for the housing 12 of FIG. 3 and is labeled with 100 series reference numerals. The housing 112 now includes an inlet port 140 and an outlet port 144 at its top surface. As in FIG. 3, the ports 140 and 144 are connected with the inner surface 148 of the housing 14 by inlet channels 142 and outlet channels 146. However, channels 142 and 146 are not entirely horizontal, but include a vertical segment as well. The housing 112 can also be used in cooperation with the rotatable block 114 of FIG. 4 which includes angled passageways 154 and 156.

FIG. 6 illustrates an alternative filter 110 which has two distinct differences over filter 10 shown in FIG. 1. First, the outlet aperture 124 is located on the side of the head 120 at an elevation that is offset from inlet aperture 122. The outlet aperture 124 is now also positioned on a surface that is generally perpendicular to the axes of the passageways 54 and 56. Thus, the inlet aperture 122 and the outlet aperture 124 are immediately adjacent the inlet passageway 54 and the outlet passageway 56, respectively. A small head O-ring 136 is placed between the inlet aperture 122 and the outlet aperture 124. The second cavity portion 52 is enlarged to receive the upper surface of the head 120 of the filter 110 fills the second cavity portion 52 in FIG. 7. In contrast to the design incorporating the outlet aperture 24 at the top of the head 20 as shown in FIG. 1, no water is contained above the head 120. Consequently, no leakage from the second cavity portion 52 occurs upon removal of the filter 110.

FIG. 6 also illustrates the protrusions 130 and 131 as having different sizes. Thus, the filter 110 can only be inserted in one orientation which ensures proper alignment of the inlet and outlet apertures 122 and 124 to the inlet and outlet passageways 54 and 56. The protrusions can also be the same size, but offset around the filter 110 at an angle other than 180° to accomplish the same goal of insertion in one orientation.

The filter 110 can also be equipped with a check valve 170 at either of the inlet and outlet apertures 122 and 124, or at both apertures 122 and 124, such that when the filter 110 is removed from the housing 12 and rotatable block 14, a shield of the check valve 170 acts to close those apertures 122 and 124. This eliminates any possible flow of water contained within a full filter 110 from the apertures 122 and 124. The shield typically moves into and out of its proper position under the force of a spring element. The check valve 170 illustrated in FIG. 6 is shown internally hinged to the head 120 adjacent the inlet aperture 122. The filter 10 of FIG. 1 can also use a check valve 170. As an alternative to the check valve 170, the internal structure of the head 120 of the filter 110 defining the path of the fluid beyond the aperture 122 and 124 can be angled to retain the fluid therein when the filter 110 is removed.

In FIGS. 1–7, the various embodiments utilizing the housing 12 and the rotatable block 14 have numerous applications where the fluid in the fluid lines needs to be acted upon in some manner by means of a fluid treatment device. The housing 12 and rotatable block 14 are configured to provide for easy installation and replacement of that fluid treatment device. Furthermore, the housing 12 and rotatable block 14 allow for replacement of the fluid treatment device with either a minimal or no discharge of fluid due to the geometry of the inlet and outlet passageways 54 and 56 and the placement of filter 10.

One primary use of the invention is for the filtration of water and, more particularly, tap water. This may be performed near a tap where one would typically retrieve a glass of water. Alternatively, it may be performed at a location where the tap water is provided to a separate device which receives tap water, such as a refrigerator which dispenses the tap water as liquid or uses it to make ice.

Alternatively, the filter 10 may be used to clean a lubrication fluid such as oil. This would likely require different materials for the housing 12 and the block 14 if the filtration occurs at high temperatures. Other non-filtration uses exist as well. For example, the filter 10 can be replaced with a heat exchanger or a mixing device, among other things. The only difference is in the internal components contained within the treatment device. For example, the heat exchanger includes internal heating or cooling coils and fins contained within the treatment device which act upon the fluid to change it thermal characteristics. A mixing device may have a contained volume of material which is to be mixed with the passing fluid at a slow rate. The material may be granules of fertilizer or pesticides which is mixed with water and distributed to plants. The mixing device may also be coupled to an outside source which supplies the mixing material to the mixing device at higher rate.

Each of these embodiments and obvious variations thereof is contemplated as falling within the spirit and scope of the invention, which is set forth in the following claims.

What is claimed is:

1. A system for filtering fluid within a fluid line, said filtration system comprising:

a housing having an internal chamber, an inlet port for receiving said fluid, an outlet port for dispensing said fluid, an inlet channel connecting said inlet port to said internal chamber, and an outlet channel connecting said internal chamber to said outlet port;

a block disposed within said internal chamber of said housing and having a first and second position, said block having an internal cavity, an exterior surface, an inlet passageway connecting said internal cavity with said exterior surface, and an outlet passageway connecting said internal cavity with said exterior surface;

a removable filter with at least a portion positioned within said internal cavity of said block, having an inlet aperture and an outlet aperture, said inlet passageway of said block being aligned with both said inlet channel of said housing and said inlet aperture of said filter, and said outlet passageway of said block being aligned with said outlet channel of said housing for permitting flow of said fluid through said block and into said filter when said block is in said first position, and said inlet passageway of said block being misaligned with both said inlet channel of said housing and said inlet aperture of said filter, and said outlet passageway of said block being misaligned with both said outlet channel of said housing and said outlet aperture of said filter for prohibiting flow of said fluid into said block when said block is in said second position;

said inlet passageway and said outlet passageway of said block being oriented to retain said fluid therein when said filter is removed.

2. The filtration system of claim 1, wherein said inlet and outlet passageways of said block are angled with respect to the horizontal in the range from about 5° to about 20° with portions of said inlet and outlet passageways adjacent said housing being at a lower elevation than portions adjacent said internal cavity of said block.

3. The filtration system of claim 2, wherein said inlet and outlet passageways of said block have a length in the range from about 0.25 inch to about 1.0 inch.

4. The filtration system of claim 3, wherein said filter includes protrusions and said housing further includes a track for receiving and guiding said protrusions, said protrusions and said track providing detachable attachment of said filter to said housing.

5. The filtration system of claim 1, wherein portions of said inlet and outlet passageways of said block near said internal cavity of said block are angled upwardly.

6. The filtration system of claim 1, wherein each of said inlet and outlet passageways of said block is at a lowest elevation adjacent said exterior surface of said block.

7. The filtration system of claim 1, wherein said outlet passageway of said block is vertically offset from said inlet passageway of said block.

8. The filtration system of claim 1, wherein said inlet aperture of said filter is immediately adjacent said inlet passageway of said block and said outlet aperture of said filter is immediately adjacent said outlet passageway of said block when said removable filter is positioned within said internal cavity of said block.

9. The filtration system of claim 1, wherein said movement between said first position and a second position is rotational movement.

10. A fluid routing system for placement in a fluid line having a first segment and second segment, said fluid routing system receiving fluid from said first segment of said fluid line and returning said fluid to said second segment of said fluid line, said fluid routing system comprising:

a housing having an internal chamber, an inlet port for attaching to said first segment of said fluid line, an outlet port for attaching to said second segment of said fluid line, an inlet channel connecting said inlet port to said internal chamber, and an outlet channel connecting said internal chamber to said outlet port;

a block capable of movement between a first and second position and being disposed within said internal chamber of said housing, said block having a first internal cavity, a second internal cavity, an exterior surface, an inlet passageway connecting said first internal cavity with said exterior surface, and an outlet passageway connecting said second internal cavity with said exterior surface; and a removable fluid treatment device receiving said fluid from said inlet passageway and returning said fluid to said outlet passageway, said fluid treatment device having at least a portion positioned within said first internal cavity of said block and having an inlet aperture and an outlet aperture, said inlet aperture being near said inlet passageway and said outlet aperture being near said outlet passageway when said block is in said first position; and when said block is in said first position said inlet passageway of said block being aligned with said inlet channel of said housing for permitting flow of fluid into said inlet aperture and said outlet passageway of said block being aligned with said outlet channel of said housing for permitting flow of said fluid from said outlet aperture, and when said block is in said second position said inlet passageway of said block being misaligned with said inlet channel of said housing and said outlet passageway of said block being misaligned with said outlet channel of said housing for prohibiting flow of said fluid into said block and permitting removal of said fluid treatment device;

said inlet and outlet passageways of said block being oriented to retain said fluid therein in said second position after said fluid treatment device is removed.

11. The fluid routing system of claim 10, wherein said fluid treatment device is fixed relative to said block.

12. The fluid routing system of claim 11, wherein transition between said first position and said second position is effectuated by rotation of said fluid treatment device.

13. The fluid routing system of claim 10, wherein said inlet and outlet passageways are angled with respect to the horizontal in the range from about 5° to about 20° with portions of said inlet and outlet passageways adjacent said housing being at a lower elevation than portions adjacent said internal chamber.

14. The fluid routing system of claim 10, wherein portions of said inlet and outlet passageways near said internal chamber are angled upwardly.

15. The fluid routing system of claim 10, wherein each of said inlet and outlet passageways is at a lowest elevation adjacent said exterior surface of said block.

16. The fluid routing system of claim 10, wherein said outlet passageway is vertically offset from said inlet passageway.

17. The fluid routing device of claim 10, wherein said housing includes at least one opening and at least one track and said fluid treatment device includes at least one protrusion, said protrusion cooperating with said opening and said track for providing detachable attachment of said fluid routing device to said housing.

18. The fluid routing system of claim 17, wherein said housing includes two of said openings having a first and second size, said fluid treatment device including two protrusions corresponding to said first and second sizes, each of said protrusions being inserted into an associated one of said openings for permitting said fluid treatment device to be inserted in only one orientation.

19. The fluid routing system of claim 10, wherein said outlet aperture and said inlet aperture are positioned along a surface of said fluid treatment device that is generally perpendicular to axes of said inlet and outlet passageways.

20. The fluid routing system of claim 10, wherein at least one of said inlet and outlet apertures is positioned along a surface of said fluid routing device that is generally parallel to axes of said inlet and outlet passageways.

21. The fluid routing system of claim 10, wherein said inlet and outlet channels of said housing are generally horizontal.

22. The fluid routing system of claim 10, wherein said inlet and outlet passageways have a length in the range from about 0.25 inch to about 1.0 inch.

23. The fluid routing system of claim 10, wherein said fluid treatment device is fixed relative to said housing.

24. The fluid routing system of claim 10, wherein said fluid treatment device is a filter.

25. A filtration system for placement in a fluid line having first and second segments, said filtration system receiving fluid from said first segment of said fluid line and returning said fluid to said second segment of said fluid line, said filtration system comprising:

a housing having an internal chamber, an inlet port for attaching to said first segment of said fluid line, an outlet port for attaching to said second segment of said fluid line, an inlet channel connecting said inlet port to said internal chamber, and an outlet channel connecting said internal chamber to said outlet port;

a block capable of movement between a first and second position and being disposed within said internal chamber of said housing, said block having a first internal cavity, a second internal cavity, an exterior surface, an inlet passageway connecting said first internal cavity with said exterior surface, and an outlet passageway connecting said second internal cavity with said exterior surface;

a filter having a head and filtering media for filtering said fluid, said head having an inlet aperture near said inlet passageway, and an outlet aperture near said outlet passageway; and when said block is in said first position said inlet passageway of said block being aligned with said inlet channel of said housing for permitting flow of fluid into said inlet aperture and said outlet passageway of said block being aligned with said outlet channel of said housing for permitting flow of said fluid from said outlet aperture, and when said block is in said second position said inlet passageway of said block being misaligned with said inlet channel of said housing and said outlet passageway of said block being misaligned with said outlet channel of said housing for prohibiting flow of said fluid into said block and permitting removal of said filter;

said inlet and outlet passageways of said block being oriented to retain said fluid therein in said second position after said filter is realigned.

26. The filtration system of claim 25, wherein said inlet and outlet passageways are at a lowest elevation adjacent said exterior surface of said block.

27. The filtration system of claim 25, wherein said outlet passageway is vertically offset from said inlet passageway.

28. The filtration system of claim 25, wherein said outlet aperture and said inlet aperture are positioned along a surface of said head of said filter that is generally perpendicular to axes of said inlet and outlet passageways.

29. The filtration system of claim 25, wherein at least one of said inlet and outlet apertures is positioned along a surface of said filter that is generally parallel to axes of said inlet and outlet passageways.

30. The filtration system of claim 25, wherein portions of said inlet and outlet passageways near said internal chamber are angled upwardly.

31. The filtration system of claim 25, wherein said inlet and outlet apertures are immediately adjacent to said inlet and outlet passageways.

32. The filtration system of claim 25, wherein said inlet and outlet passageways have a length in the range from about 0.25 inch to about 1.0 inch.

33. The filtration system of claim 25, wherein said filter includes protrusions and said housing further includes a track for receiving and guiding said protrusions, said protrusions and said track providing detachable attachment of said filter to said housing.

34. The filtration system of claim 33, wherein at least one of said protrusions and its corresponding opening are of a different size for permitting said filter to be inserted in only one orientation.

35. The filtration system of claim 25, wherein said filter is detachably attached to said housing.

* * * * *